(12) United States Patent
Moriyama et al.

(10) Patent No.: US 12,504,353 B2
(45) Date of Patent: Dec. 23, 2025

(54) CELL MANIPULATION DEVICE AND CELL MANIPULATION METHOD

(71) Applicant: NIKON CORPORATION, Tokyo (JP)

(72) Inventors: Masaki Moriyama, Kawasaki (JP); Takeshi Kawano, Hino (JP)

(73) Assignee: NIKON CORPORATION, Tokyo (JP)

( * ) Notice: Subject to any disclaimer, the term of this patent is extended or adjusted under 35 U.S.C. 154(b) by 910 days.

(21) Appl. No.: 17/593,544

(22) PCT Filed: Mar. 25, 2020

(86) PCT No.: PCT/JP2020/013367
§ 371 (c)(1),
(2) Date: Sep. 20, 2021

(87) PCT Pub. No.: WO2020/196635
PCT Pub. Date: Oct. 1, 2020

(65) Prior Publication Data
US 2022/0170826 A1    Jun. 2, 2022

(30) Foreign Application Priority Data
Mar. 25, 2019  (JP) .................................. 2019-055986

(51) Int. Cl.
  *G01N 1/14*   (2006.01)
  *C12N 5/00*   (2006.01)
(52) U.S. Cl.
  CPC ............. *G01N 1/14* (2013.01); *C12N 5/0068* (2013.01)

(58) Field of Classification Search
  CPC ..... B01L 2200/0668; B01L 2200/0673; B01L 2300/0832; B01L 99/00; C12M 35/04; C12M 47/04; G01N 1/14; C12N 2509/10; C12N 5/0068; C12N 1/02
  See application file for complete search history.

(56) References Cited

U.S. PATENT DOCUMENTS

2018/0298318 A1   10/2018   Kurz et al.

FOREIGN PATENT DOCUMENTS

| JP | 03-050900 U | 5/1991 | |
|----|----|----|----|
| JP | 2010172231 A * | 8/2010 | ............ C12M 33/00 |
| JP | 2017-112923 A | 6/2017 | |
| WO | WO 2015/098919 A1 | 7/2015 | |

OTHER PUBLICATIONS

Yonekawa, JP2010172231A "Apparatus for collecting cell or colony and method for collecting cell or colony" Google Patents Machine Translation (Year: 2010).*
International Search Report mailed Jun. 16, 2020 for PCT/JP2020/013367, with English translation, 4 pages.
(Continued)

*Primary Examiner* — Dean Kwak
(74) *Attorney, Agent, or Firm* — Squire Patton Boggs (US) LLP (57) ABSTRACT

A cell manipulation method is provided including: culturing cells in a liquid; disposing a flow path through which a gas is able to be introduced in the liquid; forming an air bubble at an end portion of the flow path; and attaching the cells to the air bubble.

6 Claims, 11 Drawing Sheets

(56) References Cited

OTHER PUBLICATIONS

Written Opinion of the International Searching Authority mailed Jun. 16, 2020 for PCT/JP2020/013367, with English translation, 11 pages.
Notification of The Second Office Action dated May 1, 2024 for Chinese Patent Application No. 202080032753.4; with English translation, 7 pages.
Communication forwarding the extended European Search Report dated Jan. 5, 2023 for European Patent Application No. 20777867.1; 9 pages.
Notification of The First Office Action dated Jan. 3, 2024 for Chinese Patent Application No. 2020800327534; with English translation, 12 pages.
Decision of Rejection dated Sep. 4, 2024, for Chinese Patent Application No. 202080032753.4; with English (machine) translation, 10 pages.

\* cited by examiner

CELL MANIPULATION DEVICE AND CELL MANIPULATION METHOD

CROSS-REFERENCE

The present application is a 35 USC 371 national phase filing of PCT/JP2020/013367, filed Mar. 25, 2020, which claims the benefit of and priority to Japanese Patent Application No. 2019-055986, filed Mar. 25, 2019, the content of which is incorporated herein by reference.

TECHNICAL FIELD

The present invention relates to a cell manipulation device and a cell manipulation method.

BACKGROUND ART

In the related art, in cell culture, proteolytic enzymes such as trypsin or collagenase are utilized in the case of detaching cells adhered to culture vessels such as a Petri dish. Proteolytic enzymes cleave adhesion factors such as integrin which attaches cells to inner wall surfaces of culture vessels and adhesion factors such as cadherins which adhere cells to each other. Thus, it is possible to detach cells adhered to culture vessels. Furthermore, a method and an apparatus for locally heating a scaffold material and detaching cells through irradiation of shock waves have also been proposed (Patent Literature 1).

CITATION LIST

Patent Literature

[Patent Literature 1] Japanese Unexamined Patent Application, First Publication No. 2017-112923

SUMMARY OF INVENTION

Technical Problem

However, when a proteolytic enzyme is utilized, all cells in a vessel are detached and cannot be selectively detached. Furthermore, a method for locally heating a scaffold material needs to utilize a culture vessel coated with a prescribed scaffold material in advance and a large-sized apparatus is required for a method for providing shock waves.

Solution to Problem

An adhesion manipulation method according to an embodiment includes: a step of culturing cells in a liquid; a step of disposing a flow path through which a gas is able to be introduced in the liquid; a step of forming an air bubble at an end portion of the flow path; and a step of attaching the cells to the air bubble.

A cell manipulation device according to an embodiment is a cell manipulation device which detaches cells cultured in a liquid and attaches the cells to an air bubble including: a flow path which is disposed in the liquid and through which a gas is able to be introduced into the liquid, wherein the air bubble are able to be formed at an end portion of the flow path.

DESCRIPTION OF EMBODIMENTS

An embodiment of the present invention will be described in detail below with reference to the drawings in some cases. In the drawings, the same or corresponding portions are denoted by the same or corresponding reference numerals and duplicate description thereof will be omitted. Dimensional ratios in the respective drawings may be exaggerated for illustration in some cases and do not necessarily match actual dimensional ratios.

Method for Manipulating Cells First Embodiment

In an embodiment, the present invention provides a cell manipulation method including a step of culturing cells in a liquid, a step of disposing a flow path through which a gas can be introduced in the liquid, a step of forming an air bubble at an end portion of the flow path, and a step of attaching the cells to the air bubble. It can also be said that the method in the embodiment is a method for detaching adherent cells from a solid phase including bringing a gas/liquid interface into contact with the adherent cells cultured on a surface of a solid phase and moving the interface along the surface.

As will be described later in examples, the inventors of the present invention have found that adherent cells can be detached from a solid phase through the method of the embodiment without utilizing a proteolytic enzyme or the like.

The expression "adherent cells" mentioned herein refer to cells which are adhered to a solid phase. In this specification, also in the case of floating cells which were originally cultured in a floating state, the floating cells are regarded as adherent cells under the conditions in which the floating cells are adhered to a solid phase.

In the method in the embodiment, examples of the gas include, but not are particularly limited to, air and nitrogen. The gas may be sterilized. Examples of a method for sterilizing the gas include, but are not particularly limited to, passing through a filter with a pore size of about 0.22 µm or less. Furthermore, as the liquid, a cell medium, a buffer solution, or the like may be utilized. Although the gas/liquid interface is not particularly limited as long as it is a surface in which a gas and a liquid are in contact with each other, examples of the gas/liquid interface include a circumferential edge of an air bubble formed due to a gas or a surface of the air bubble, a liquid/gas interface when a gas flows after a liquid flows into a fluid device, a liquid/gas interface when a liquid flows after a gas flows in a fluid device, and the like.

First Embodiment

In a method for detaching cells according to a first embodiment, at least a part of the solid phase forms a flow path. Furthermore, bringing a gas/liquid interface into contact with the adherent cells and moving the interface in a direction along the surface are performed by causing an air bubble to flow in the flow path.

Figure 1:
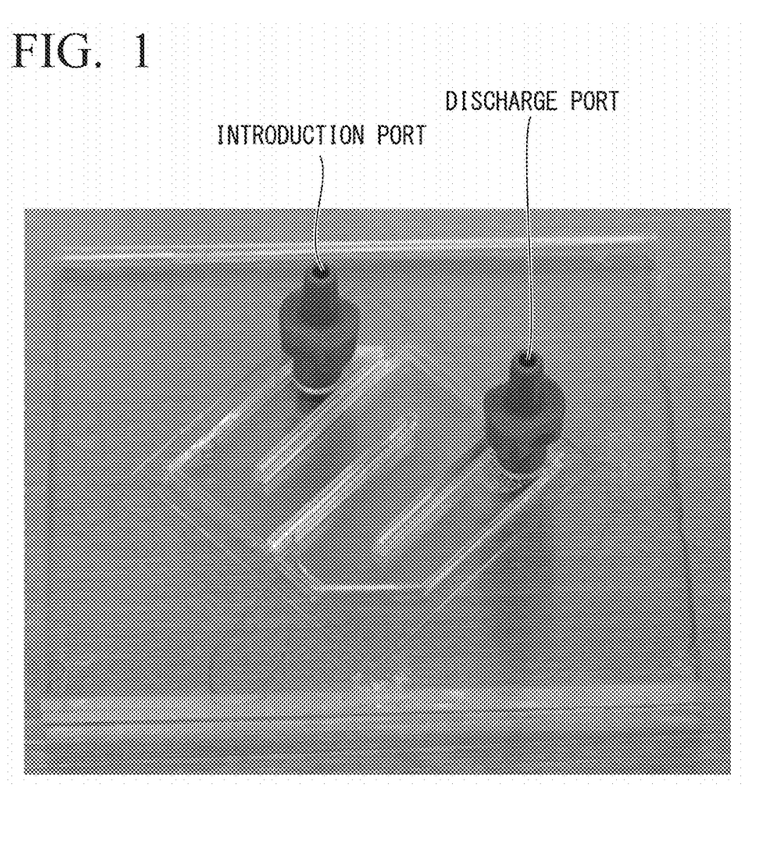
FIG. 1 is a photograph showing an example of a cell culture vessel.

FIG. 1 is a photograph showing an example of a cell culture vessel. In the cell culture vessel shown in FIG. 1, a solid phase forms a flow path and adherent cells can be cultured on a surface of the solid phase by supplying a medium to the flow path. The flow path includes an introduction port and a discharge port. It is possible to introduce a medium, cells, a gas, and the like through the introduction port and it is possible to discharge the medium, cells, a gas, and the like through the discharge port.

According to the method for detaching cells associated with the first embodiment, when a gas is introduced through the introduction port of the cell culture vessel exemplified in FIG. 1 and flows toward the discharge port, a gas/the medium interface comes into contact with the adherent cells and moves along the surface of the flow path. Thus, it is possible to detach the adherent cells cultured on the surface of the flow path of the cell culture vessel. The gas needs to be introduced into the cells on the surface of the flow path in such an amount in which a gas/liquid interface comes into contact with the cells.

As a method for moving a gas/liquid interface, a gas may be continuously introduced through the introduction port of the flow path or a gas may be introduced through the introduction port of the flow path to form an air bubble and then a liquid or a gas may be further introduced through the introduction port of the flow path to move the air bubble toward the discharge port. The liquid may be a cell medium, a buffer solution, or the like. Thus, a gas/liquid interface comes into contact with the adherent cells, the interface moves in a direction along the surface of the flow path, and thus the cells detach from the solid phase.

In the method for detaching cells according to the first embodiment, at least a part of the solid phase may be disposed in the flow path. The surface of the solid phase refers to a surface on which adherent cells can adhere and be cultured, including, for example, glass; resins such as polystyrene; metals; surfaces coated with one or more extracellular matrix components selected from collagen, fibronectin, laminin, polylysine, and the like; surfaces coated with various polymers (for example, polymers whose hydrophilicity and adsorption to cells can be controlled), and the like. The present invention is not limited thereto.

Cell Manipulation Device

In an embodiment, the present invention provides a cell manipulation device which includes a flow path which is disposed in a liquid and through which a gas is able to be introduced into the liquid and which is capable of forming the air bubble at the end portion of the flow path, detaching cells cultured in the liquid, and attaching the cells to the air bubble. It can also said that the cell manipulation device in the embodiment has a tubular portion in which an air bubble can be generated at the end portion when the end portion is disposed in the liquid. The cell detaching device in the embodiment is constituted so that the air bubble can come into contact with adherent cells cultured on a surface of the solid phase.

Figure 2A:
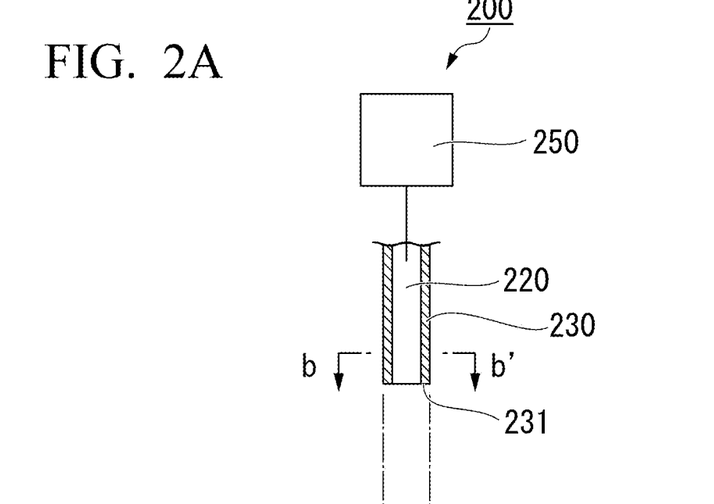
FIGS. 2A to 2C are schematic diagrams showing a structure of a cell detaching device (cell manipulation device) according to an embodiment.
Figure 2B:
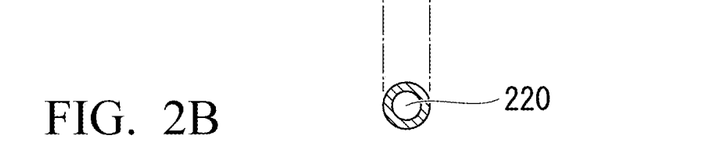
Figure 2C:
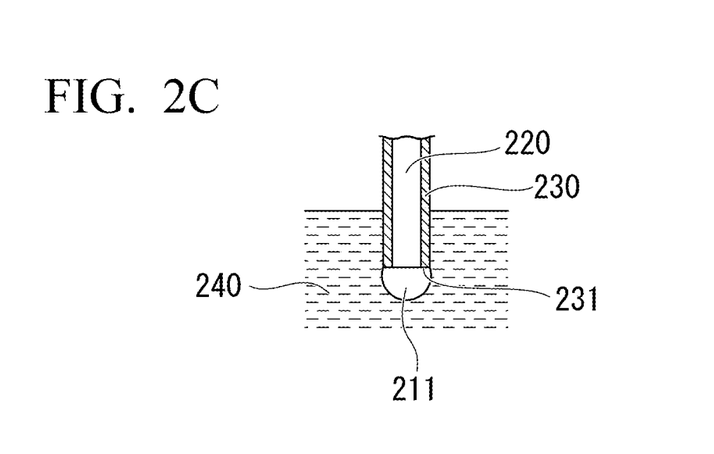

FIGS. 2A to 2C are schematic diagrams showing a structure of the cell detaching device according to an embodiment. As shown in FIGS. 2A to 2C, when a cell detaching device 200 has a tubular portion 230 having a flow path 220 through which a gas 210 flows and the gas 210 is introduced or discharged into the flow path 220, in a case in which an end portion 231 of the tubular portion 230 is disposed in a liquid 240, it is possible to generate an air bubble 211 at the end portion 231. The cell detaching device 200 shown in FIG. 2A is connected to a control unit 250 which manually or automatically controls a volume of the air bubble 211 by controlling an amount of the gas 210 introduced or discharged into the flow path 220 and constitutes a cell detaching system. For this reason, it is possible to control the volume of the air bubble 211. Furthermore, the cell detaching device 200 can manually or automatically change a distance of the end portion 231 from the solid phase or the cells and can move the end portion 231 along a surface of the solid phase.

The control unit 250 may be constituted of, for example, a syringe, a pump, or the like. In the cell detaching device 200, the flow path 220 is a lumen of the tubular portion 230.

FIG. 2B is a cross-sectional view taken along line b-b' of the tubular portion 230 shown in FIG. 2A. As shown in FIG. 2B, the tubular portion 230 of the cell detaching device 200 has the flow path 220 having a circular cross section in a plane perpendicular to an axial direction of the tubular portion.

Although an opening area at the end portion 231 of the flow path 220 is not particularly limited as long as cells can be detached, for example, the opening area can be larger than an adhesion area of one cell. Furthermore, a shape of a distal end of the flow path 220 is not particularly limited, and an inner diameter of the flow path 220 may be the same up to the distal end, may gradually increase toward the distal end, or may gradually decrease toward the distal end. In addition, an end surface may be a surface which is perpendicular to an axis of the flow path 220 or may be a surface which is not perpendicular to the axis of the flow path 220.

Also, although the flow path 220 can also be used for collecting cells in the cell detaching device 200, the tubular portion 230 may further include a second flow path through which the detached cells are collected.

Modified Example 1

Figure 3A:
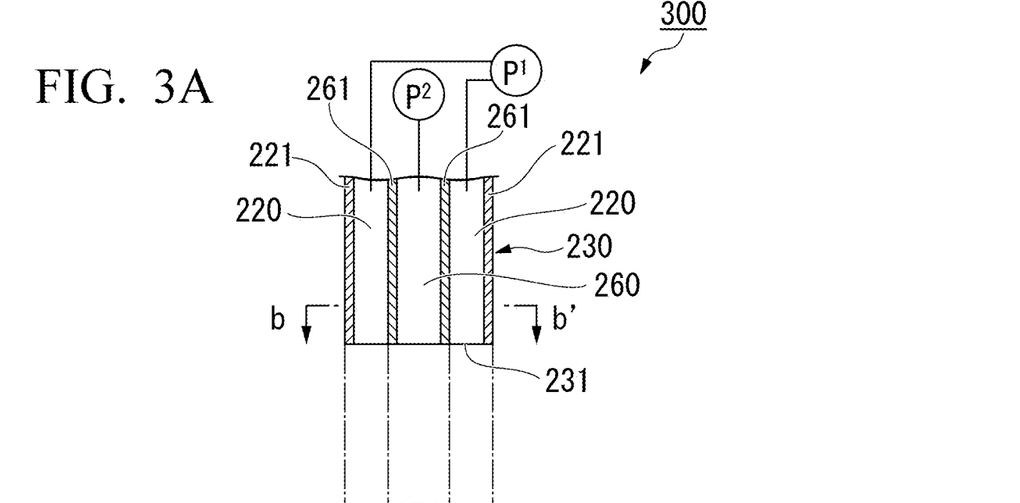
FIGS. 3A to 3C are schematic diagrams showing a structure of the cell detaching device according to an embodiment.
Figures 3B, 3C:
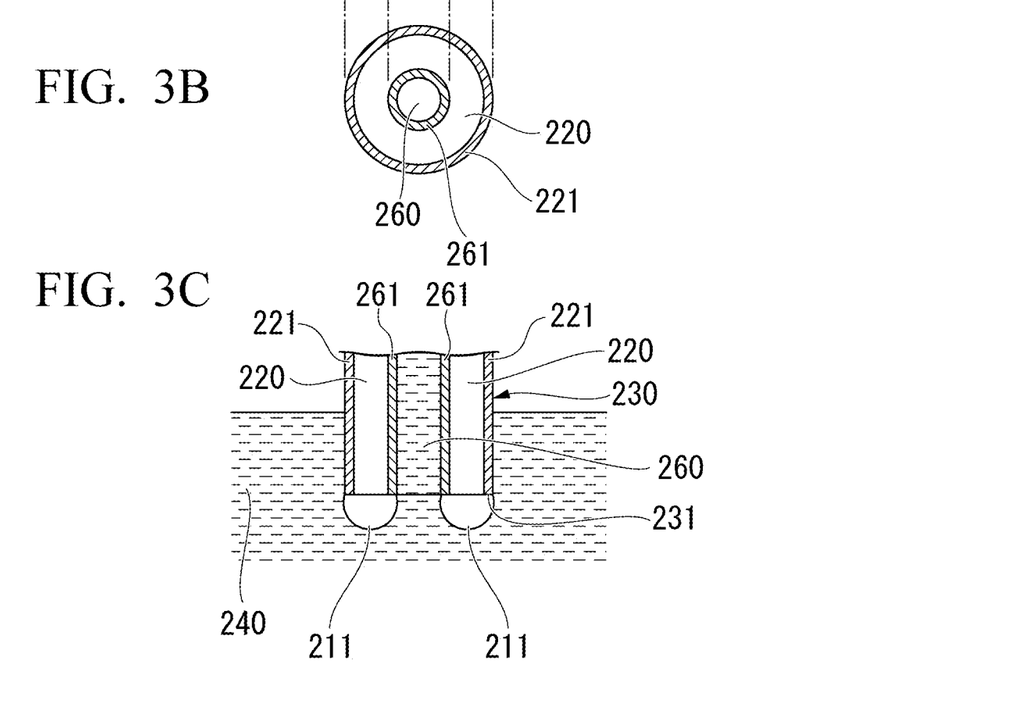

FIGS. 3A to 3C are schematic diagrams showing a structure of the cell detaching device according to an embodiment. As shown in FIG. 3A, a tubular portion 230 of a cell detaching device 300 has a double structure of an outer cylinder 221 and an inner cylinder 261, a portion between the outer cylinder 221 and the inner cylinder 261 is a first flow path 220 through which a gas 210 flows, and an inside of the inner cylinder 261 is a second flow path 260 through which the detached cells are collected. The cell detaching device 300 is connected to a control unit $P^1$ which causes an air bubble 211 to be arranged at the end portion 231 or controls a volume of the air bubble 211 by introducing or discharging the gas 210 into the first flow path 220 when an end portion 231 of the tubular portion 230 is disposed in a liquid 240 and may constitute a cell detaching system. The control unit $P^1$ includes, for example, a pump. Furthermore, as shown in FIG. 3A, the cell detaching device 300 may be connected to a control unit $P^2$ which controls a flow of a liquid in the second flow path 260.

FIG. 3B is a cross-sectional view taken along line b-b' of the tubular portion 230 shown in FIG. 3A. As shown in FIG. 3B, the tubular portion 230 of the cell detaching device 300 includes the first flow path 220 having a donut-shaped cross section and the second flow path 260 surrounded by the first flow path 220.

Although the gas 210 is introduced or discharged into the first flow path 220 and the detached cells are collected using the second flow path 260 in the example described above, the gas 210 may be introduced or discharged into the second flow path 260 and the cells may be collected using the first flow path 220. If the cell detaching device 300 is compared with the cell detaching device 200, the cell detaching device 300 and the cell detaching device 200 mainly differ in that the first flow path 220 through which the gas 210 flows to form an air bubble and the second flow path 260 through which cells are collected are independently provided.

Also, as shown in FIG. 3C, a shape of the air bubble 211 arranged at the end portion 231 of the tubular portion 230 of the cell detaching device 300 is a donut shape. According to the cell detaching device 300, since the first flow path 220 and the second flow path 260 are independently provided, it is possible to collect the detached cells through the second flow path 260 while the cells are detached using the air bubble 211 arranged at the end portion 231 of the first flow path 220.

Modified Example 2

Figure 4A:
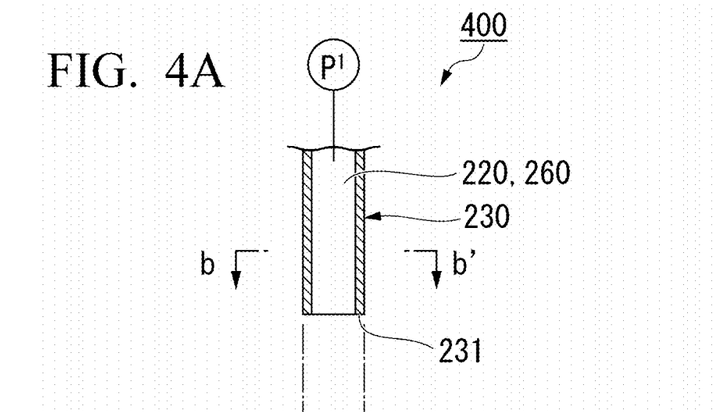
FIGS. 4A to 4C are schematic diagrams showing a structure of the cell detaching device according to an embodiment.
Figure 4B:
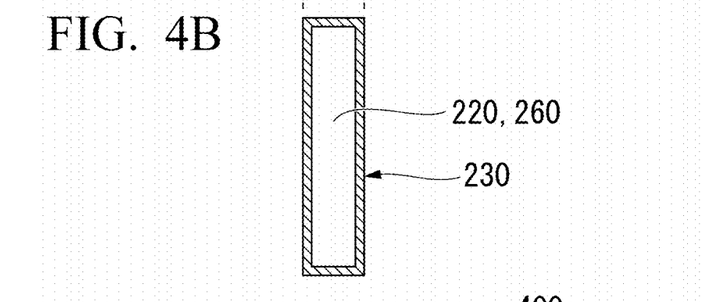
Figure 4C:
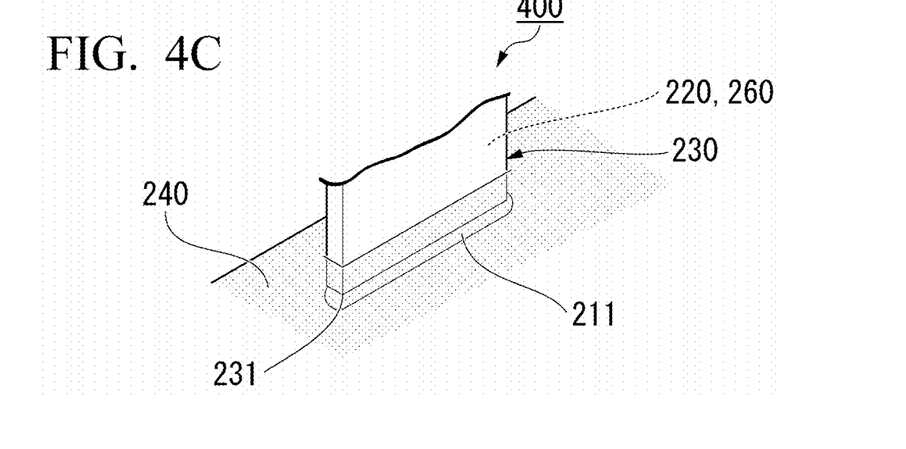

FIGS. 4A to 4C are schematic diagrams showing a structure of the cell detaching device according to an embodiment. As shown in FIG. 4A, a cell detaching device 400 is connected to a tubular portion 230 having a flow path 220 through which a gas 210 flows and a control unit $P^1$ which causes an air bubble 211 to be arranged at the end portion 231 or controls a volume of the air bubble 211 by introducing or discharging the gas 210 into the flow path 220 when an end portion 231 of the tubular portion 230 is arranged in a liquid 240 and may constitute a cell detaching system. The control unit $P^1$ includes, for example, a pump.

In the cell detaching device 400, the flow path 220 also serves as a flow path through which cells are collected.

FIG. 4B is a cross-sectional view taken along line b-b' of the tubular portion 230 shown in FIG. 4A. As shown in FIG. 4B, if the tubular portion 230 of the cell detaching device 400 is compared with that of the cell detaching device 200 described above, the tubular portion 230 of the cell detaching device 400 and that of the cell detaching device 200 described above mainly differ in view of a cross-sectional shape in a plane perpendicular to the tubular portion 230 in an axial direction.

FIG. 4C is a perspective view showing a state in which the air bubble 211 are arranged at the end portion 231 of the tubular portion 230 of the cell detaching device 400. As shown in FIG. 4C, the air bubble 211 formed at the end portion 231 of the tubular portion 230 of the cell detaching device 400 are long in one direction. For this reason, detaching a wider range of adherent cells is easy. Particularly, when the tubular portion 230 is moved in a direction perpendicular to a longitudinal direction of the tubular portion 230, it is possible to efficiently detach the adherent cells.

Although the flow path 220 also serves as a flow path through which cells are collected in the cell detaching device 400, the present invention is not limited thereto. In addition, the flow path 220 and a cell collecting flow path 260 may be independently provided. In this case, for example, the cell collecting flow path 260 may be disposed inside the flow path 220, the flow path 220 may be disposed inside the cell collecting flow path 260, or the flow path 220 and the cell collecting flow path 260 may have the same shape and may be disposed adjacent to each other.

Method for Manipulating Cells Second to Fourth Embodiments

Second Embodiment

A method for detaching cells according to a second embodiment includes bringing a gas/liquid interface into contact with adherent cells cultured on a surface of a solid phase and moving the gas/liquid interface along the surface. Moreover, the bringing of the gas/liquid interface into contact with the adherent cells is performed by bringing an air bubble generated at an end portion of the tubular portion of the cell detaching device including the tubular portion into contact with the adherent cells. Furthermore, the moving of the gas/liquid interface along the surface is performed by moving the air bubble along the surface of the solid phase.

Figure 5A:
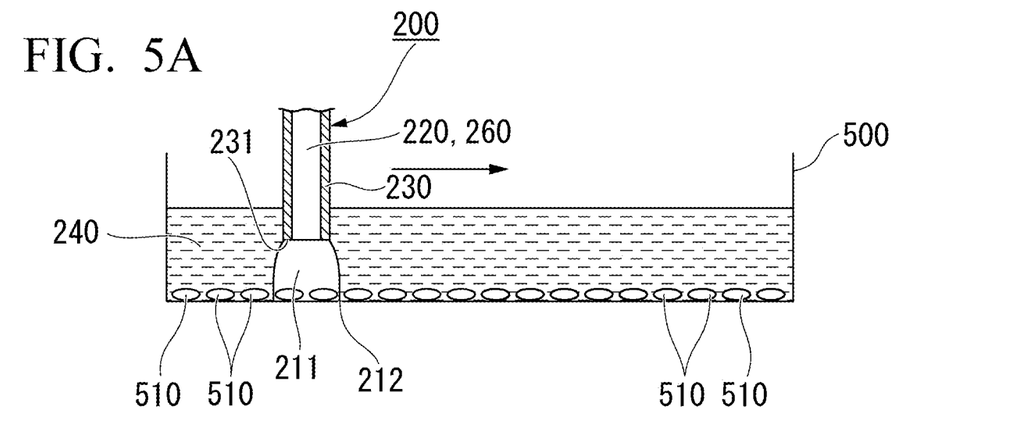
FIG. 5A to 5C are schematic diagrams for explaining an example of a method for detaching cells (cell manipulation method).
Figure 5B:
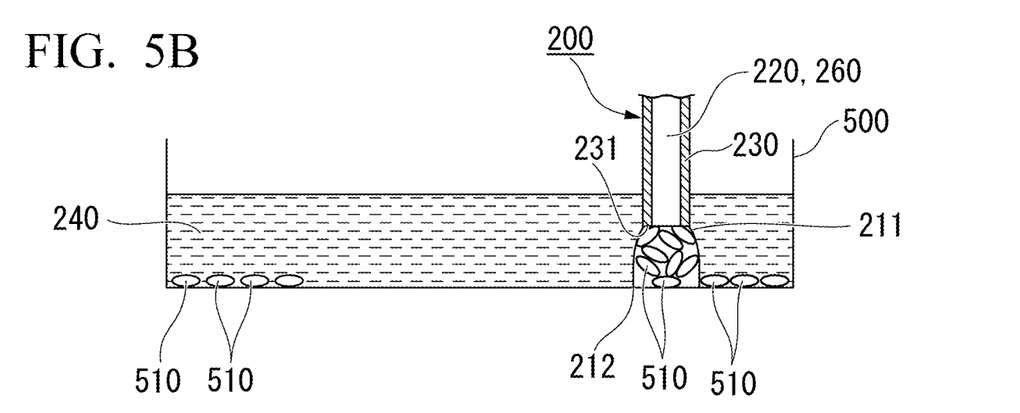
Figure 5C:
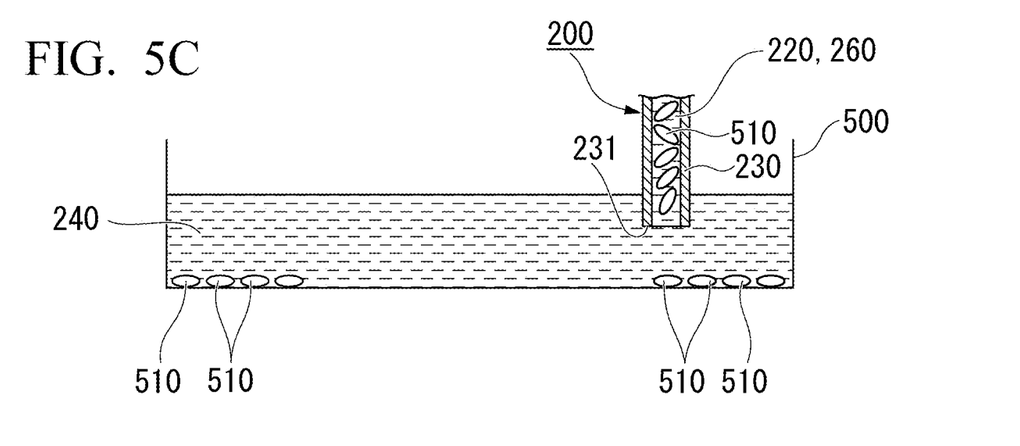

FIGS. 5A to 5C are schematic diagrams for explaining an example of the method of the second embodiment. A case in which cells are detached using the cell detaching device 200 described above will be described below. FIG. 5A shows a state in which adherent cells 510 are cultured on a surface of the culture vessel 500. The adherent cells 510 are cultured in the medium (liquid) 240.

First, as shown in FIG. 5A, the gas 210 is introduced into the flow path 220 of the cell detaching device 200 and the air bubble 211 are arranged at the end portion 231 of the tubular portion 230. Moreover, the air bubble 211 are brought into contact with the adherent cells 510. Thus, an interface 212 between the gas 210 and the liquid 240 (around a contact surface between the air bubble 211 and the culture vessel 500) comes into contact with the adherent cells 510.

Subsequently, the cell detaching device 200 is moved in a direction along a surface of a culture vessel (solid phase) while keeping the air bubble 211 in contact with the adherent cells 510. FIG. 5A shows a direction in which the cell detaching device 200 moves with arrows. The direction along the surface of the solid phase is not particularly limited and may be any direction as long as the direction is a direction parallel to the surface of the solid phase.

As will be described later in examples, surprisingly, it is possible to detach the adherent cells 510 from the culture vessel 500 through the above manipulation.

FIG. 5B is a schematic diagram showing a state in which the adherent cells 510 are detached. If the cell detaching device 200 is moved in a line-like manner, it is possible to detach the adherent cells 510 in a line shape. Furthermore, when sizes of the air bubble 211 are changed, it is possible to detach the adherent cells 510 in a line shape having a desired thickness. In addition, as shown in FIG. 5B, the inventors of the present invention have found that the detached adherent cells 510 attach to surfaces of the air bubble 211.

Here, as shown in FIG. 5C, cells 510 attached to the surfaces of the air bubble 211 may be collected by suctioning the gas 210 of the flow path 220. According to the embodiment, it is possible to selectively detach cells using an apparatus having a simple constitution and it is also possible to collect the detached cells.

Figure 6A:
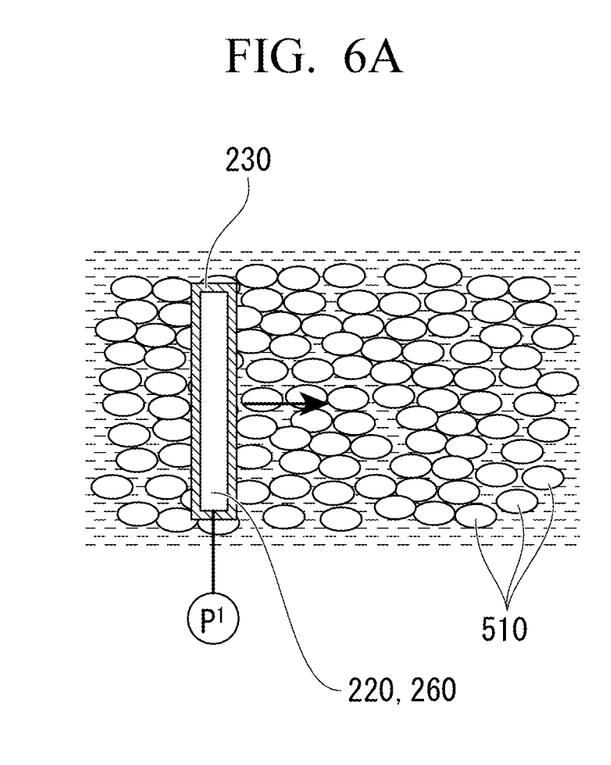
FIGS. 6A and 6B are schematic diagrams for explaining an example of the method for detaching cells.
Figure 6B:
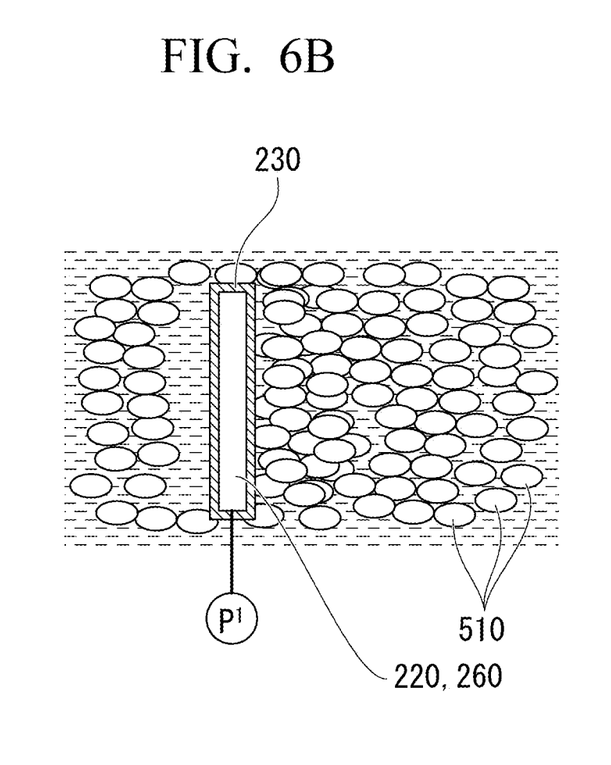

FIGS. 6A and 6B are schematic diagrams for explaining an example of the method of the second embodiment. A case in which cells are detached using the cell detaching device 400 described above will be described below. FIG. 6A is a top view showing a state in which the adherent cells 510 are cultured at the surface of the culture vessel 500. The adherent cells 510 are cultured in the medium (liquid) 240.

First, as shown in FIG. 6A, the gas 210 is introduced into the flow path 220 of the cell detaching device 400 and the air bubble 211 are arranged at the end portion 231 of the tubular portion 230. Moreover, the air bubble 211 are brought into contact with the adherent cells 510. Thus, the interface 212 between the gas 210 and the liquid 240 comes into contact with the adherent cells 510.

Subsequently, the cell detaching device 400 is moved in the direction along the surface of the culture vessel (solid phase) while keeping the air bubble 211 in contact with the adherent cells 510. FIG. 6A shows a direction in which the cell detaching device 200 moves with an arrow. The direction along the surface of the solid phase is not particularly limited and may be any direction as long as the direction is parallel to the surface of the solid phase.

FIG. 6B is a schematic diagram showing a state in which the adherent cells 510 are detached. After that, the detached adherent cells 510 may be collected through a flow path 260.

The method of the second embodiment has been described above using a case in which the cell detaching devices 200 and 400 are utilized as an example. However, in the method of the second embodiment, as the cell detaching device, cell detaching devices other than the cell detaching devices 200 and 400 may be utilized. Examples of the cell detaching devices other than the cell detaching devices 200 and 400 include, but are not limited to, the cell detaching device 300 described above and the like.

Third Embodiment

A method for detaching cells according to a third embodiment includes bringing a gas/liquid interface into contact with adherent cells cultured on a surface of a solid phase and moving the gas/liquid interface in a direction along the surface. Moreover, the bringing of the gas/liquid interface into contact with the adherent cells is performed by bringing the air bubble of the cell detaching device described above in which the air bubble are arranged at the end portion into contact with the adherent cells. Furthermore, the moving of the gas/liquid interface in the direction along the surface is performed by changing a volume of the air bubble of the cell detaching device.

Figure 7A:
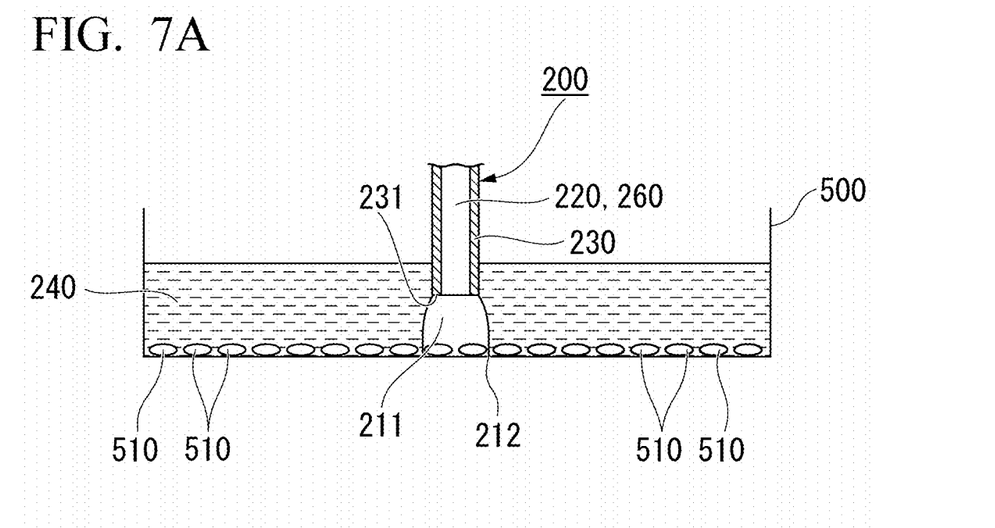
FIGS. 7A and 7B are schematic diagrams for explaining an example of the method for detaching cells.
Figure 7B:
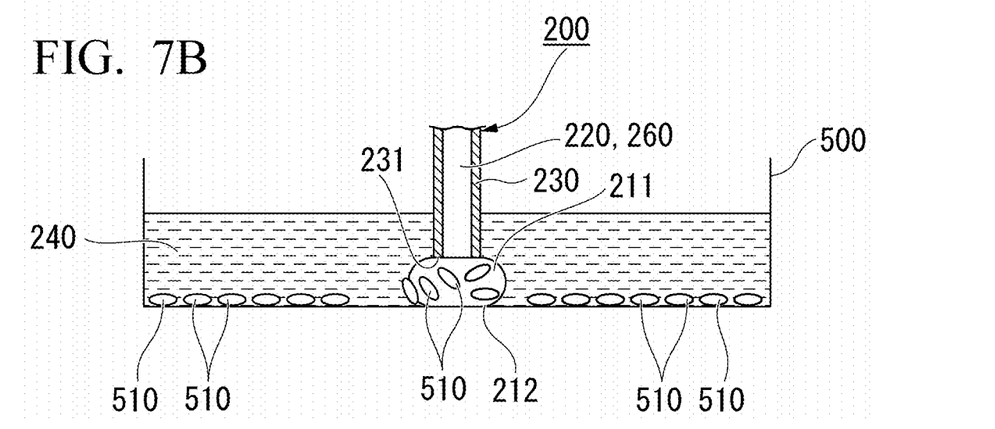

FIGS. 7A and 7B are schematic diagrams for explaining an example of the method of the third embodiment. A case in which cells are detached using the cell detaching device 200 described above will be described below. FIG. 7A shows a state in which adherent cells 510 are cultured at the surface of the culture vessel 500. The adherent cells 510 are cultured in the medium (liquid) 240.

First, as shown in FIG. 7A, the gas 210 is introduced into the flow path 220 of the cell detaching device 200 and the air bubble 211 are arranged at the end portion 231 of the tubular portion 230. Moreover, the air bubble 211 are brought into contact with the adherent cells 510. Thus, the interface 212 between the gas 210 and the liquid 240 comes into contact with the adherent cells 510.

Subsequently, a volume of the air bubble 211 of the cell detaching device 200 is changed. To be specific, as shown in FIG. 7B, the gas 210 is introduced into the flow path 220 to increase a volume of the air bubble 211.

As a result, the gas/liquid interface 212 (around a contact surface between the air bubble 211 and the culture vessel 500) moves in the direction along the surface of the culture vessel. That is to say, the surfaces of the air bubble move in all directions about the adherent cells 510 which are present directly under the flow path 220.

As will be described later in the examples, it is also possible to detach the adherent cells 510 from the culture vessel 500 through the above manipulation. Furthermore, as shown in FIG. 7B, the inventors of the present invention have found that the detached adherent cells 510 attach to the surfaces of the air bubble 211.

Here, the cells 510 attached to the surfaces of the air bubble 211 may be collected by suctioning the gas 210 in the flow path 220.

The method of the third embodiment has been described above using a case in which the cell detaching device 200 is utilized as an example. However, in the method of the third embodiment, a cell detaching device other than the cell detaching device 200 may be utilized as the cell detaching device. Examples of the cell detaching device other than the cell detaching device 200 include, but are not limited to, the cell detaching device 300, the cell detaching device 400, and the like described above.

Fourth Embodiment

A method for detaching cells according to a fourth embodiment includes bringing a gas/liquid interface into contact with adherent cells cultured on a surface of a solid phase and moving the gas/liquid interface in a direction along the surface. Moreover, the bringing of the gas/liquid interface into contact with the adherent cells is performed by bringing the air bubble of the cell detaching device described above in which the air bubble are arranged at the end portion into contact with the adherent cells. Furthermore, the moving of the gas/liquid interface in the direction along the surface is performed by changing a distance between the cell detaching device and the adherent cells.

Figure 8A:
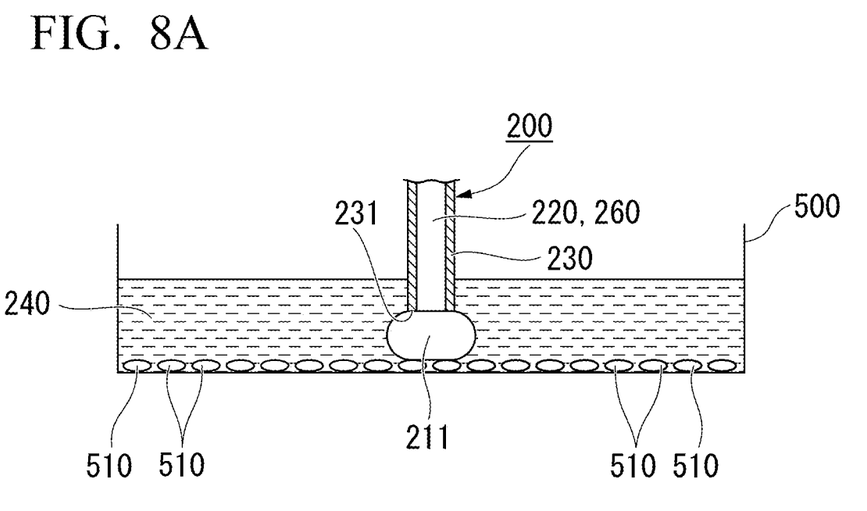
FIGS. 8A and 8B are schematic diagrams for explaining an example of the method for detaching cells.
Figure 8B:
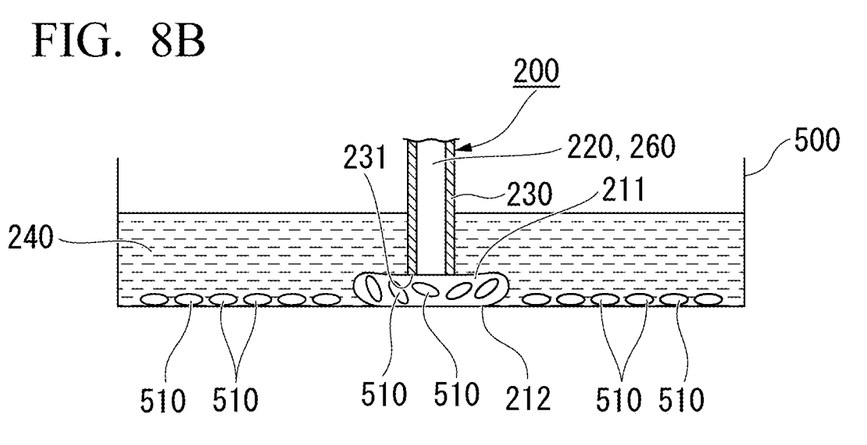

FIGS. 8A and 8B are schematic diagrams for explaining an example of the method of the fourth embodiment. A case in which cells are detached using the cell detaching device 200 described above will be described below. FIG. 8A shows a state in which the adherent cells 510 are cultured on the surface of the culture vessel 500. The adherent cells 510 are cultured in the medium (liquid) 240.

First, as shown in FIG. 8A, the gas 210 is introduced into the flow path 220 of the cell detaching device 200 and the air bubble 211 are arranged at the end portion 231 of the tubular portion 230. Moreover, the air bubble 211 are brought into contact with the adherent cells 510. Thus, the interface 212 between the gas 210 and the liquid 240 comes into contact with the adherent cells 510.

Subsequently, a distance between the cell detaching device and the adherent cells is changed. To be specific, as shown in FIG. 8B, the tubular portion 230 is brought closer to the surface of the culture vessel. As a result, the air bubble 211 deform.

As a result, the gas/liquid interface 212 (around the contact surface between the air bubble 211 and the culture vessel 500) moves in the direction along the surface of the culture vessel. That is to say, the surfaces of the air bubble move in all directions about the adherent cells 510 which are present directly under the flow path 220.

It is also possible to detach the adherent cells 510 from the culture vessel 500 through the above manipulation. Furthermore, as shown in FIG. 8B, the inventors of the present invention have found that the detached adherent cells 510 attach to the surfaces of the air bubble 211.

Here, the cells 510 attached to the surfaces of the air bubble 211 may be collected by suctioning the gas 210 in the flow path 220.

The method of the fourth embodiment has been described above using a case in which the cell detaching device 200 is utilized as an example. However, in the method of the fourth embodiment, a cell detaching device other than the cell detaching device 200 may be utilized as the cell detaching device. Examples of the cell detaching device other than the cell detaching device 200 include, but are not limited to, the cell detaching device 300, the cell detaching device 400, and the like described above.

Although a technique for detaching the adherent cells adhered to the solid phase has been described in each of the embodiment described above, the embodiments of the present invention are not limited thereto. For example, although the detached adherent cells attach to the surfaces of the air bubble by bringing the detached adherent cells into contact with the air bubble, the attaching of the cells to the surfaces of the air bubble can also be applied to floating cells floating in a culture solution.

Cell Manipulation System

In an embodiment, the present invention provides a cell detaching system including (i) a cell detaching device which includes a tubular portion capable of generating an air bubble at the end portion when the end portion is arranged in a liquid, and (ii) a control unit which controls the generation of the air bubble by introducing or discharging the gas into the tubular portion of the cell detaching device.

The control unit is the same as that described above and may be constituted of, for example, a syringe, a pump, a CPU which controls these, and the like. With the cell detaching system in the embodiment, it is possible to efficiently perform the cell detaching method described above. It is also possible to collect the detached cells.

Fluid Device System

In an embodiment, the present invention provides a fluid device system including a fluid device in which a solid phase capable of culturing adherent cells on a surface is disposed in a flow path and the above-described cell detaching system. The fluid device system in the embodiment allows adherent cells to be cultured and further detached. It is also possible to collect the detached cells.

As described above, the cell detaching device, the cell detaching system, and the fluid device system are apparatuses with a simple constitution and can selectively detach and collect cells. Therefore, for example, when target cells are cultured on feeder cells, it can be utilized to remove only unnecessary feeder cells and can be applied to regenerative medicine. It is also useful in a scratch assay which evaluates a rate of cell migration to a portion in which cells are detached and collected.

EXAMPLES

Although the embodiment will be described below with reference to examples, the present invention is not limited to the following examples.

Experimental Example 1

(Cell Detachment in Flow Path))
<<Preparation of Culture Vessel>>

A cell culture vessel shown in the photograph in FIG. 1 was prepared. To be specific, the cell culture vessel was prepared by laminating a first polydimethylsiloxane (PDMS) sheet with a thickness of 0.1 mm, a first acrylic plate with a thickness of 2 mm, a second PDMS sheet with a thickness of 0.1 mm, and a second acrylic plate with a thickness of 2 mm on a glass substrate in this order.

The first and second PDMS sheets and the first acrylic plate were laminated by hollowing out a flow path pattern with the shape shown in FIG. 1 using a laser processing machine (model "VLS2.30;" Yokohama Systems, Ltd.). Furthermore, the second acrylic plate was laminated by forming holes serving as an introduction port and a discharge port. Subsequently, an adapter shown in FIG. 1 was attached to the introduction port and the discharge port to obtain the cell culture vessel.

<<Cell Culture>>

Cells were cultured in the flow path of the prepared cell culture vessel. As the cells, Kato III cells which were human gastric cancer cell lines were utilized.

<<Cell Detachment>>

Figure 9A:
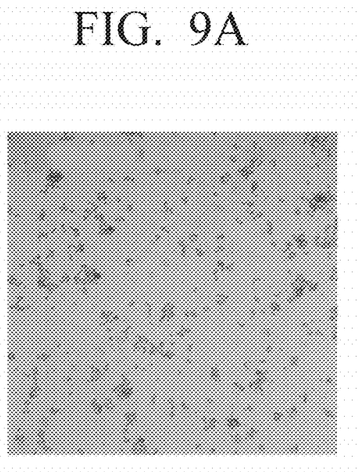
FIGS. 9A to 9E are photomicrographs obtained by photographing a flow path of a cell culture vessel in Experimental Example 1.
Figure 9B:
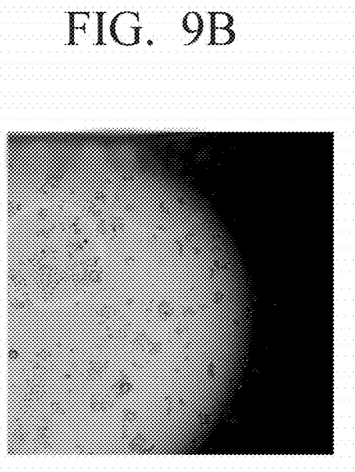
Figure 9C:
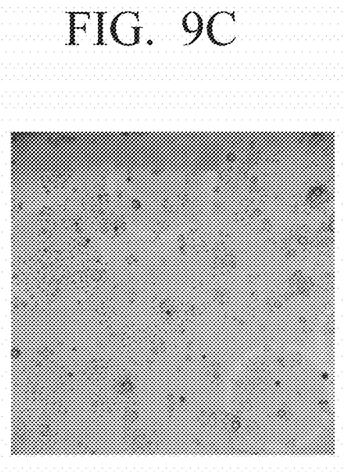
Figure 9D:
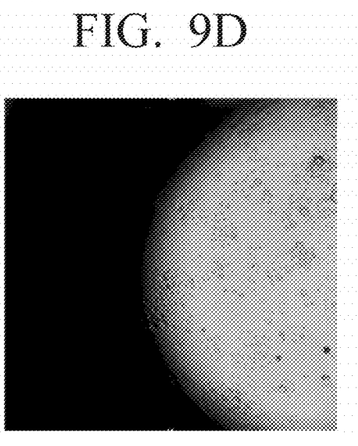
Figure 9E:
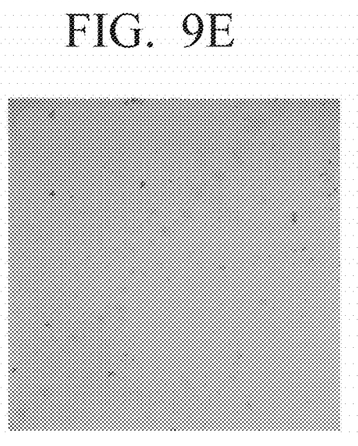

Approximately 1 day after the start of the culture, air flowed in the flow path of the cell culture vessel, a medium flowed, and then observation was performed using a microscope. FIGS. 9A to 9E are photographs of a microscope obtained by capturing the flow path of the cell culture vessel. A magnification is 4 times. FIG. 9A is a photograph of the flow path before air is introduced. FIG. 9B is a photograph obtained by capturing a state in which air is flowing into an observation region of the flow path. FIG. 9C is a photograph obtained by capturing a state in which the observation region of the flow path is fully filled with air. FIG. 9D is a photograph obtained by capturing a state in which air is flowing out from the observation region of the flow path. FIG. 9E is a photograph obtained by capturing a state in which the observation region of the flow path is filled with a medium again.

As a result, it was confirmed in FIG. 9E that the cells in the flow path were detached and flowed out of the observation region. It was clear from this result that it is possible to detach the adherent cells from the solid phase by bringing the gas/liquid interface into contact with the adherent cells cultured on the surface of the solid phase and then moving the gas/liquid interface in the direction along the surface.

Experimental Example 2

(Cell Detachment 1 Using Cell Detaching Device)

Adherent cells were detached using a cell detaching device having the same constitution as the cell detaching device 200 described above.

First, cells were cultured using a cell culture dish. As the cells, HeLa cells which are cell lines derived from human cervical cancer were utilized. After the cells were cultured until the cells became confluent, a detachment experiment was performed.

Figure 10A:
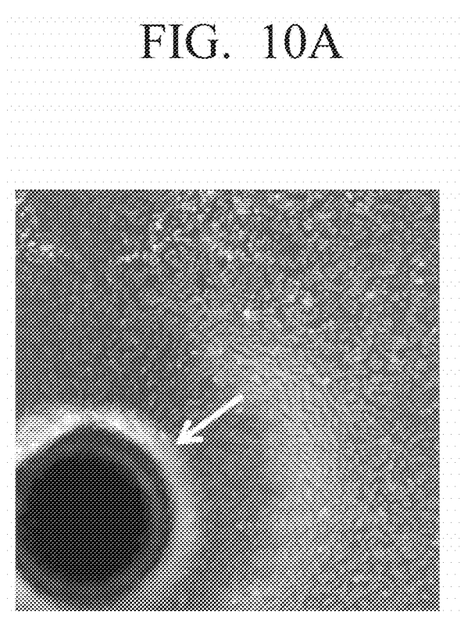
FIGS. 10A to 10C are photographs of a microscope obtained by capturing a state of a cell detaching experiment in Experimental Example 2.
Figure 10B:
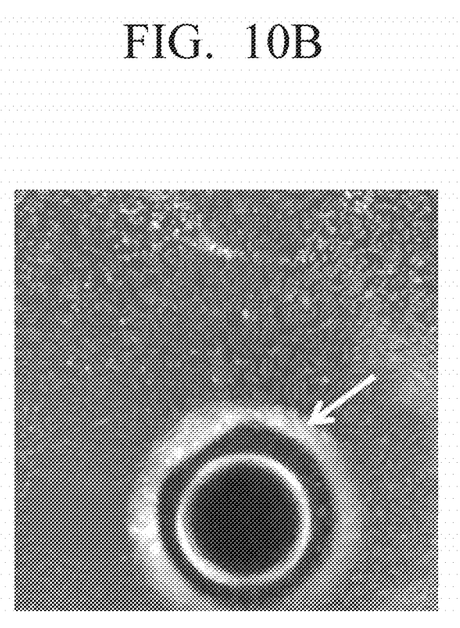
Figure 10C:
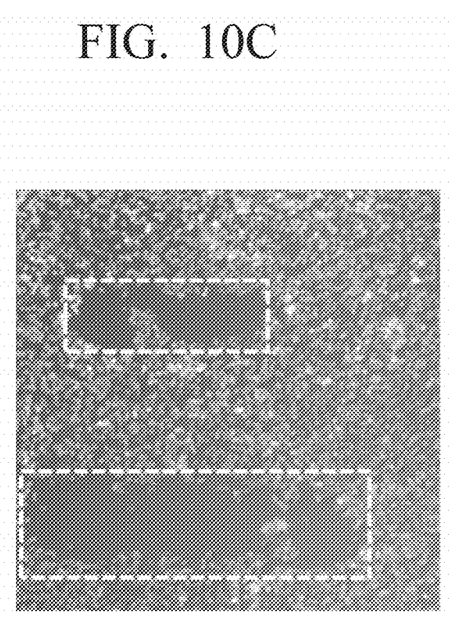

FIGS. 10A to 10C are photographs of a microscope obtained by capturing states of a cell detaching experiment. A magnification is 4 times. First, as shown in FIG. 10A, an end portion of the cell detaching device was brought close to cells. An arrow points to the end portion of the cell detaching device.

Subsequently, as shown in FIG. 10B, an air bubble of air were formed at the end portion of the cell detaching device and brought into contact with the cells and the cell detaching device was moved in a direction parallel to a bottom surface of the cell culture dish. In FIG. 10B, an arrow points to the end portion of the cell detaching device.

FIG. 10C is a photograph obtained by capturing a state after the cells were detached. In FIG. 10C, a portion surrounded by a dotted line indicates a region in which the cells are detached. It can be seen that the cells were detached in a line shape as the air bubble moved. The result further supports that the adherent cells can be detached from the solid phase by bringing the gas/liquid interface into contact with the adherent cells cultured on the surface of the solid phase and then moving the gas/liquid interface in the direction along the surface.

Experimental Example 3

(Cell Detachment 2 Using Cell Detaching Device)

Adherent cells were detached using a cell detaching device having the same constitution as the cell detaching device 200 described above.

First, cells were cultured using a cell culture dish. As the cells, HeLa cells which are cell lines derived from human cervical cancer were utilized. After the cells were cultured until the cells became confluent, a detachment experiment was performed.

Figure 11A:
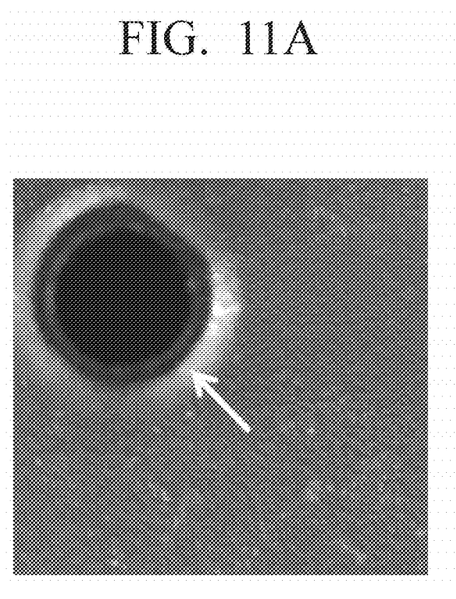
FIGS. 11A to 11C are photographs of a microscope obtained by capturing a state of a cell detaching experiment in Experimental Example 3.
Figure 11B:
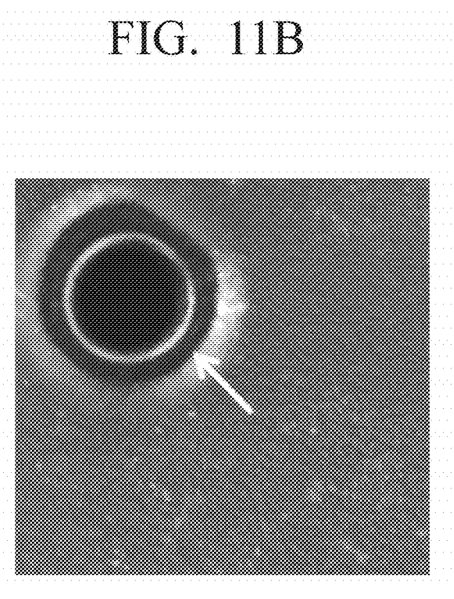
Figure 11C:
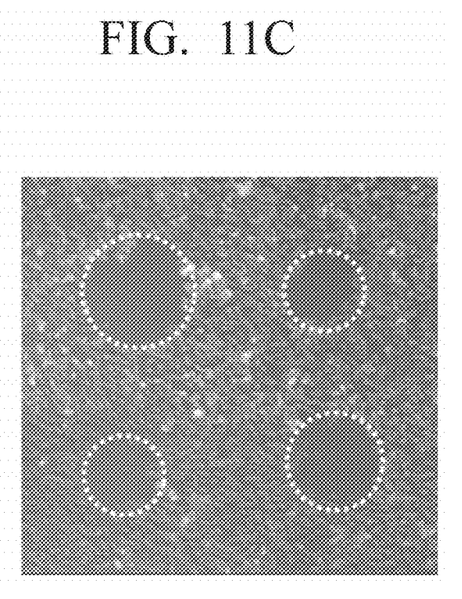

FIGS. 11A to 11C are photographs of a microscope obtained by capturing states of a cell detaching experiment. A magnification is 4 times. First, as shown in FIG. 11A, an end portion of the cell detaching device was brought close to cells. In FIG. 11A, an arrow points to the end portion of the cell detaching device.

Subsequently, as shown in FIG. 11B, a volume of an air bubble were increased by forming the air bubble at the end portion of the cell detaching device and increasing an amount of air introduced into the flow path of the cell detaching device. In FIG. 11B, an arrow points to the end portion of the cell detaching device. The same manipulation was performed four times. Furthermore, a volume of the air bubble was changed each time.

FIG. 11C is a photograph obtained by capturing a state after the cells are detached. In FIG. 11C, a portion surrounded by a dotted line indicates a region in which the cells are detached. The cells in a substantially circular region through which the surroundings of the air bubble had passed were detached. It was clarified that an area in which the cells were detached can be controlled by changing the volume of the air bubble. The result further supports that the adherent cells can be detached from the solid phase by bringing the adherent cells cultured on the surface of the solid phase into contact with the gas/liquid interface and then moving the gas/liquid interface in the direction along the surface.

REFERENCE SIGNS LIST

200, 300, 400 Cell detaching device (cell manipulation device)
210 Gas
211 Air bubble
212 Interface
220 Flow path (first flow path)
221 Outer cylinder
230 Tubular portion
231 End portion
240 Liquid
250, $P^1$, $P^2$ Control unit
260 Second flow path
261 Inner cylinder
500 Culture vessel
510 Adherent cells

The invention claimed is:

1. A cell manipulation device, comprising:
a flow path, an end portion of which is configured to be disposed in a liquid and through which a gas is introduced into the liquid, the liquid being a liquid within which cells on a solid phase are cultured, and
a control unit for controlling the operation of the flow path, the control unit being configured to
(i) form an air bubble that extends out of the end portion of the flow path,
(ii) control a volume of the air bubble that extend out of the end portion of the flow path for allowing the air bubble to be maintained and to remain in contact with the solid phase while the flow path having the air bubble extending therefrom is moved across a surface the solid phase for allowing cells on the surface of the solid phase to attach to the air bubble, and
(iii) collect the cells that adhere to the air bubble through the flow path.

2. The cell manipulation device according to claim 1, wherein the device is configured to allow a distance between the end portion and the solid phase to be changed.

3. The cell manipulation device according to claim 1, wherein
the cells are cells cultured on the surface of the solid phase in a culture vessel,
the end portion of the flow path is configured to be moved along the surface, and
the end portion of the flow path includes a shape that produces an air bubble that is longer in a direction perpendicular to a direction that the end portion is configured to be moved along the surface.

4. The cell manipulation device according to claim 1, wherein the flow path is a lumen extending through a tubular portion.

5. The cell manipulation device according to claim 4, wherein
the tubular portion includes an inner lumen surrounded by an outer lumen, and wherein
the control unit comprises
a first control unit in communication with the outer lumen and configured to form an air bubble that extends out of the outer lumen and to control the volume of the air bubble by regulating the amount of gas through the outer lumen, and
a second control unit in communication with the inner lumen and configured to extract the cells attached to the air bubble through the inner lumen.

6. A cell manipulation system, comprising:
the cell manipulation device according to claim 1.

* * * * *